Patented Mar. 13, 1951

2,544,637

UNITED STATES PATENT OFFICE 2,544,637

SOLUTIONS OF POLYAMIDES

John R. Caldwell, Kingsport, Tenn., assignor to Eastman Kodak Company, Rochester, N. Y., a corporation of New Jersey No Drawing. Application September 22, 1949, Serial No. 117,264

1 Claim. (Cl. 260—30.6)

This invention relates to solutions or "dopes" of polyamides derived from hexamethylene diamine and adipic acid. Such polyamides and their preparation are described, for instance, in U. S. Patents 2,130,523 and 2,163,584. Only a few solvents for these polyamides have been reported in the art. These solvents include hot formic acid, hot cresol, and hot formamide. It is obvious that many technical difficulties arise when solutions must be handled at elevated temperatures.

I have discovered that clear, smooth solutions of hexamethylene diamine-adipic acid polyamides can be prepared at room temperature by mixing the polyamide with a mixture consisting of 30–40% of 85% phosphoric acid and 70–60% of a lower aliphatic compound selected from the group consisting of the aliphatic monocarboxylic acids and their nitriles, in which the number of carbon atoms is from 2 to 5, inclusive. Suitable lower aliphatic compounds are acetic acid, propionic acid, the butyric acids, the valeric acids, acetonitrile, propionitrile, the butyronitriles and the valeronitriles.

My novel solutions can be worked at room temperature. They are stable, and show little or no change in viscosity for a week or longer. They can be made with a relatively high content of polyamide. For general use, it is preferred to dissolve 20 to 30 parts of polyamide in 100 parts of solvent mixture, by weight. However, for some purposes it may be desirable to use dopes having a concentration above or below this range.

My novel solutions of polyamides are characterized by a high degree of stability toward aging. This is of great importance in their technical utilization, because they can be filtered, degassed, etc., without danger of any change in properties being encountered.

My novel solutions or dopes find many applications. For example, they can be used in coating or impregnating textiles for the manufacture of artificial leather. After the textile is coated or impregnated with the polyamide solution, which may contain plasticizers and pigments, it is immersed in water or a lower alcohol to precipitate the polyamide. If the precipitating liquid is cold or at room temperature, the polyamide is thrown out of solution as a flocculent or granular precipitate that remains attached to the textile fabric structure. After being washed thoroughly to remove all traces of residual solvent, the coated fabric is subjected to heat and pressure, which fuses the polyamide precipitate into a homogeneous, continuous structure that is firmly attached to the textile fabric. If hot water (90–100° C.) is used as the precipitating bath, the polyamide is thrown out of solution as a continuous, opaque film that remains attached to the textile fabric. The product is washed thoroughly to remove all traces of residual solvent.

By way of illustrating the method of carrying out my invention, I give the following examples.

*Example I.*—Forty parts by weight of 85% phosphoric acid and 60 parts by weight of acetic acid were mixed. Twenty-five parts by weight of a polyamide prepared from adipic acid and hexamethylene diamine was added, and the mixture was tumbled at room temperature. A clear, smooth dope was obtained.

*Example II.*—One hundred parts by weight of acetonitrile and 50 parts by weight of 85% phosphoric acid were mixed. Forty parts by weight of a polyamide derived from adipic acid and hexamethylene diamine were stirred into the solvent mixture. A smooth, clear dope was obtained that retained its viscosity unchanged for 8–10 days.

*Example III.*—One hundred parts by weight of propionic acid and 60 parts by weight of 85% phosphoric acid were mixed. Forty parts by weight of a linear polyamide derived from adipic acid and hexamethylene diamine were dissolved in the solvent. A clear, smooth dope was obtained that showed no change in viscosity for 8–10 days.

Tumbling for 24–36 hours may be required in order to dissolve the polyamide in the solvent mixture.

What I claim as my invention and desire to be secured by Letters Patent of the United States is:

A solution of 20 to 40 parts by weight of a hexamethylene diamine-adipic acid polyamide in 100 parts by weight of a solvent consisting of 30–40% of 85% phosphoric acid and 70–60% of the nitrile of an aliphatic monocarboxylic acid in which the number of carbon atoms is from 2 to 5, inclusive, the solution being characterized by a stable viscosity.

JOHN R. CALDWELL.

REFERENCES CITED

The following references are of record in the file of this patent:

UNITED STATES PATENTS

| Number | Name | Date |
|---|---|---|
| 2,130,948 | Carothers | Sept. 20, 1938 |
| 2,489,569 | Foulds et al. | Nov. 28, 1949 |